United States Patent
Anderson

Patent Number: 5,125,184
Date of Patent: Jun. 30, 1992

[54] JACKETED NURSERY PLANT CONTAINER ASSEMBLY

[76] Inventor: George C. Anderson, 2425 SE. Moores St., Portland, Oreg. 97222

[21] Appl. No.: 668,928

[22] Filed: Mar. 13, 1991

[51] Int. Cl.⁵ .............................................. A01G 25/00
[52] U.S. Cl. .......................................... 47/81; 47/66
[58] Field of Search ................ 47/66, 79, 81, 72, 48.5, 47/71, 73, 75

[56] References Cited

U.S. PATENT DOCUMENTS

| | | | |
|---|---|---|---|
| 2,072,172 | 3/1937 | Lockyer | 47/81 |
| 2,081,337 | 5/1937 | Lockyer | 47/81 |
| 2,810,235 | 10/1957 | Magid | 47/81 |
| 4,083,146 | 4/1978 | Brankovic | 47/81 |
| 4,244,147 | 1/1981 | Geddes | 47/39 |
| 4,339,891 | 7/1982 | Bassett | 47/81 |
| 4,369,598 | 1/1983 | Beckwith | 47/66 |
| 4,885,870 | 12/1989 | Fong | 47/79 |
| 4,916,858 | 4/1990 | Hobson | 47/81 |
| 4,937,974 | 7/1990 | Costa, Jr. | 47/81 |
| 4,965,963 | 10/1990 | Lyon | 47/81 |

Primary Examiner—David A. Scherbel
Assistant Examiner—Michele A. Van Patten
Attorney, Agent, or Firm—Eugene D. Farley

[57] ABSTRACT

A nursery plant container assembly comprising an inner container which houses the plant, a base plate which supports the container, and an exterior jacket which surrounds the container. The container may be of conventional construction, with an open top and drain openings at the bottom. The base plate underlies and supports the container a spaced distance from the base plate. A peripheral wall is mounted on the base plate, creating a reservoir into which the plant treating fluids drain through the container openings.

Wicks extend through the container openings into the reservoir and return the fluid to active use in irrigating the plant. A jacket surrounding the container has at its bottom a radially extending support foot bearing against the base plate.

A retainer on the base plate positions and retains the foot. Seal means at the top of the jacket contacts the outer surface of the container and seal off the space between the container and the jacket.

7 Claims, 2 Drawing Sheets

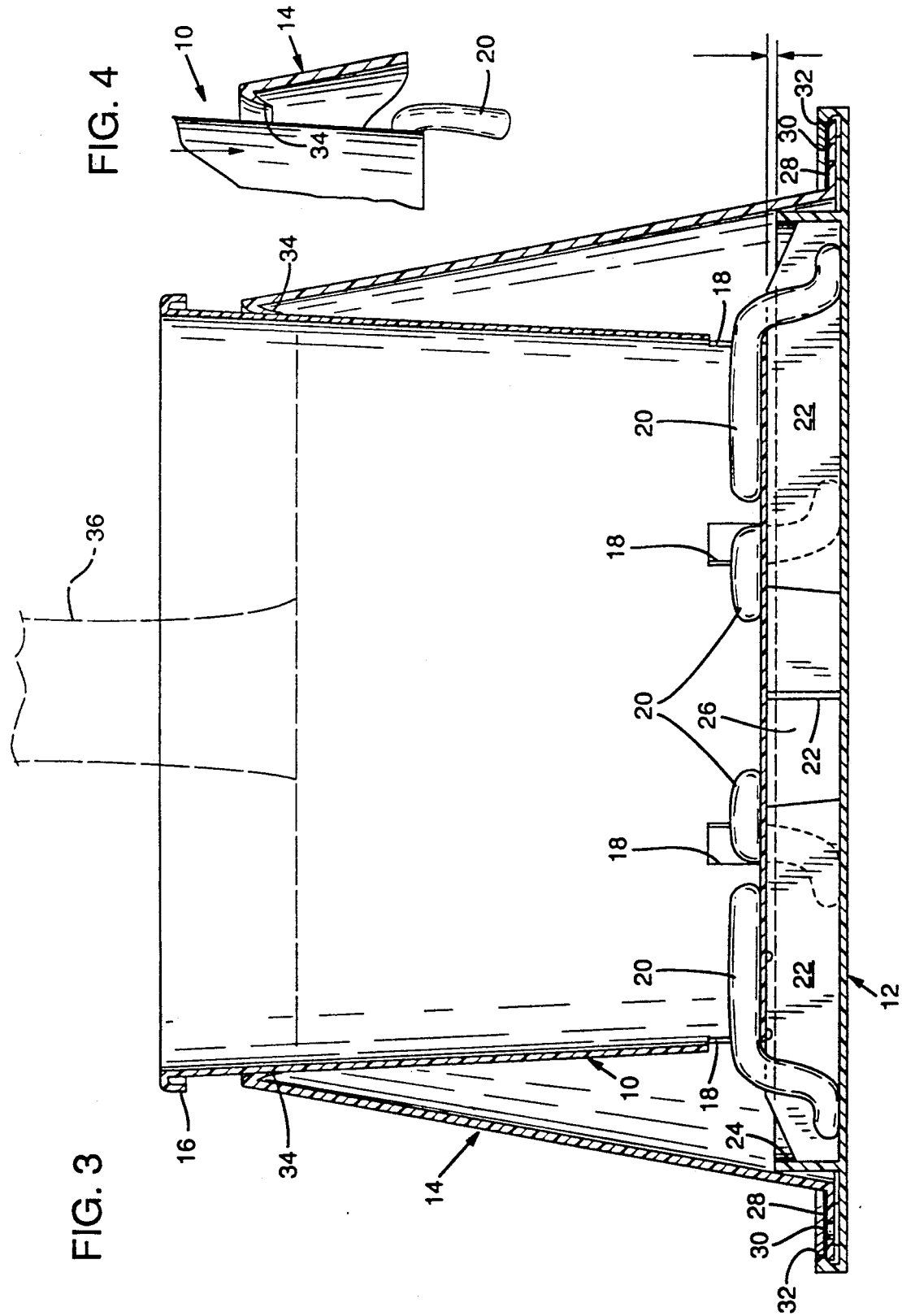

JACKETED NURSERY PLANT CONTAINER ASSEMBLY

This invention pertains to nursery plant containers in which the plants may be grown, stored, transported and merchandised.

BACKGROUND AND GENERAL STATEMENT OF THE INVENTION

For the sake of convenience and efficiency, it is common present-day practice to grow, store, transport and merchandise nursery shrubs and trees in containers of appropriate size and character. The containers widely used usually comprise round pots or tubs somewhat resembling a flower pot in contour and made of strong durable plastic.

Use of such containers presents certain problems well known to the nursery industry.

Since the containers conventionally taper inwardly in the downward direction, they upset easily when contacted, or when subjected to strong winds. This is particularly true when the plants they contain are of substantial size and height.

In hot weather, when the containers are exposed to the sun, they bake the roots of the plants they contain.

Irrigation water drains rapidly out of the drain openings with which the containers are provided, wasting water and making frequent watering mandatory.

Loss of the irrigation water results in concomitant loss to the ground of fertilizers, insecticides, soil conditioning agents, and other chemicals which have been provided to the plants contained in the containers.

Loss to the ground of chemical plant treating fluids causes obvious environmental pollution problems.

If the drain holes with which the containers are provided become plugged by the terrain on which the containers are placed, or otherwise, over-watering and resultant damage to the plants may occur.

Deleterious insects are of numerous varieties can enter the container through the drain holes and attack the plants.

It is the general object of the present invention to provide a nursery plant container assembly which overcomes the foregoing problems.

It is a further object of the present invention to provide a jacketed nursery plant container assembly which is of simple, durable, construction easily manufactured and used, which after its first use may be recycled to subsequent applications.

Broadly stated the nursery plant container assembly of my invention which accomplishes the foregoing and other objects comprises an inner container which houses the plant, a base plate which supports the container, and an exterior jacket which surrounds the container.

The container may be of conventional construction, with an open top and drain openings at the bottom.

The base plate comprises a flat plate which underlies and supports the container a spaced distance from the base plate. A peripheral wall is mounted on the base plate, creating a reservoir into which the plant treating fluids drain through the container openings.

Wick means positioned in the growing medium within the container extend through the container openings into the reservoir and return the fluid to active use in irrigating the plant.

A jacket surrounds the container above the base plate. It has at its bottom a radially extending support foot or flange bearing against the base plate outside of but adjacent the peripheral wall of the base plate.

Retainer means on the base plate position and retain the foot.

Seal means at the top of the jacket contact the outer surface of the container and seal off the space between the container and the jacket.

THE DRAWINGS

In the drawings:

FIG. 3 is a sectional view of the container taken along line 3—3 of FIG. 1.

FIG. 4 is an fragmentary view of the container similar to FIG. 3, but illustrating the manner of its assembly.

DESCRIPTION OF A PREFERRED EMBODIMENT OF THE INVENTION

Figure 1:
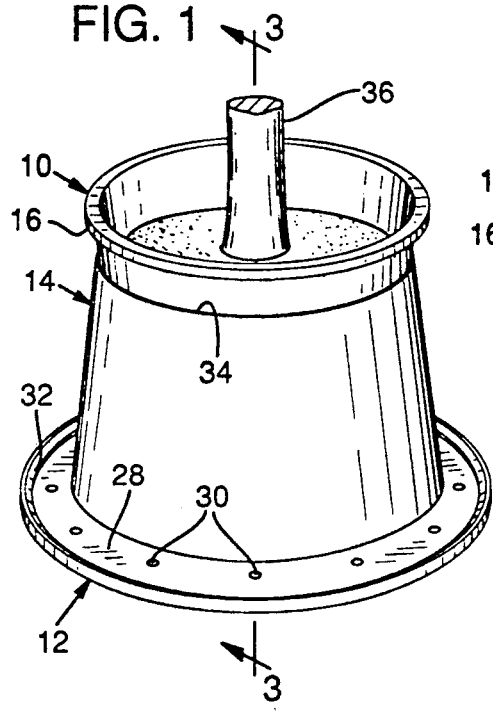
FIG. 1 is a top perspective view of my new jacketed nursery plant container in its assembled condition.
Figure 2:
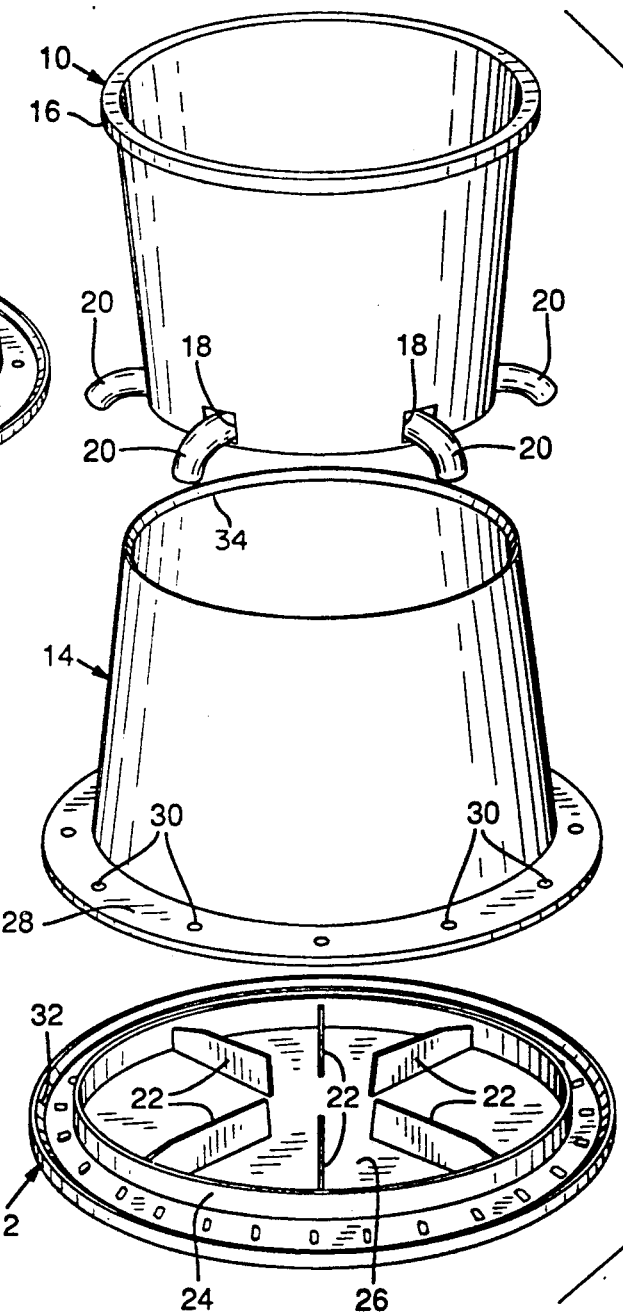
FIG. 2 is an exploded top perspective view of the container in its disassembled condition.

As noted above, the jacketed nursery plant container assembly of my invention basically comprises a container 10 for the plant, an underlying base plate 12, and a surrounding jacket indicated generally at 14.

Container 10 may be conventional in construction and preferably is contoured like a flower pot, circular in cross section, and made of durable, high density plastic. It is adapted to contain the root structure of a plant together with the necessary growing medium. To that end it is provided with an open top reinforced with a lifting flange 16. At the bottom it has a plurality of drain openings 18.

Each drain opening 18 receives a wick 20 which extends upwardly into the growing medium contained in the container. Its purpose is to return to the growing medium plant treating fluids which have drained from the container, in a manner to be explained hereinafter.

Base plate 12 comprises a flat plate, also of a suitable plastic such as polyethylene. It is dimensioned to extend radially outwardly an appreciable distance beyond the bottom of container 10. It is provided with a plurality of supports such as upwardly extending ribs 22 which engage the underside of the container and support it a spaced distance vertically from the floor of the base plate.

An upwardly extending wall 24 outside ribs 22 creates a reservoir 26 into which plant treating fluids drain from the container and into which dip the lower ends of wicks 20.

To prevent flooding of the lower portion of the container, and possible drowning of the plant contained therein, wall 24 is of somewhat less height than are support ribs 22, by an increment indicated, for example, by the extension lines and arrows of FIG. 3. As a result, when the fluid contained in the reservoir reaches the elevation of the wall, it flows over the top of the wall and drains to the exterior.

Jacket 14, which surrounds the container, also may comprise a sheet of strong, durable plastic such as polyethylene. It is contoured to flare outwardly and downwardly in the manner illustrated.

At its lower end, jacket 14 terminates in a radially extending, horizontally disposed foot or flange 28 which bears against the outer marginal portion of base plate 12.

Foot 28 is ribbed on its bottom surface (or bottom plate 12 is ribbed on its upper marginal surface) and is provided with a plurality of drain openings 30 through which overflow treating fluids can escape to the exterior in the manner explained above.

Retaining means are provided releasably to retain foot 28, and hence jacket 14, in its operative position.

In the illustrated form of the invention, such retaining means comprise a snap fastener 32 which overlies the foot. The fastener is formed integrally with base plate 12 which may be constructed of a soft material and accordingly deforms to permit operation of the fastener in the desired manner.

The upper margin of jacket 14 mounts a seal 34 which contacts the upper exterior portion of container 10 and creates in the space between the container and the jacket a dead air space which acts as a thermal barrier. This prevents overheating the plant roots and possibly killing of the plant.

In a preferred embodiment the seal may comprise an integral sealing lip on the upper margin of the jacket. The lip deforms slightly under pressure and creates the desired seal when the jacket is placed around the container.

OPERATION

In operation, jacket 14 is mounted on base plate 12 with foot 28 bearing against the outer margin of the base plate, retained by snap fastener 32.

Container 10 with plant 26 mounted therein and wicks 20 in place is inserted in the open upper end of jacket 14 until it rests on supports 22.

Seal 34 bears against the upper side wall of the container, forming a dead air insulating barrier between the jacket and container.

When the plant is irrigated, the treating fluid filters downwardly and escapes through openings 18, filling reservoir 26. If too much irrigating fluid is thus applied, it escapes over the top of retaining wall 24 and out through drain openings 30 to the exterior.

Wicks 20 return to the interior of the container the treating fluid retained in the reservoir.

Because of its downwardly and outwardly flaring contour, the container assembly can be upset only with difficulty.

The irrigation water is used over and over again, being recycled from reservoir 26 by operation of wicks 20.

Over-watering of the plant is prevented by escape of the excess treating fluids through drain holes 30. Deleterious insects are prevented from entering the container through openings 18 by operation of base plate 12.

Finally, when the plant has completed its growth cycle it may be removed from container 10 and the container assembly recycled to further application over and over again.

The objects of the invention thus are achieved.

Having thus described in detail a preferred embodiment of the present invention, it will be apparent to those skilled in the art that many physical changes may be made in the apparatus without altering the inventive concepts and principles embodied therein. The present embodiment is therefore to be considered in all respects as illustrative and not restrictive, the scope of the invention being indicated by the appended claims.

I claim:

1. A jacketed nursery plant container assembly comprising in combination:

a) a container for the root structure and growing medium of the plant having an open top and a perforate bottom portion,
 b) a peripherally walled base plate underlying the container and providing a reservoir for the collection of plant treating fluids,
 c) on the base plate a plurality of upwardly extending supports engaging the container and supporting the same a spaced distance from the base plate,
 d) wick means positioned in the growing medium and extending through the perforations in the bottom portion of the container and into the reservoir for transporting plant treating fluids drained into the reservoir back up into the container; and
 e) a vertically arranged insulating jacket surrounding the container above the base plate and having at its bottom an outwardly extending support foot bearing against the base plate radially outside of, but adjacent, the wall component thereof.

2. The plant container assembly of claim 1 including snap fit retainer means on the base plate positioned for releasably engaging the jacket support foot.

3. The plant container assemble of claim 1 wherein the jacket support foot is provided with drain openings permitting drainage of excess treating fluids to the exterior.

4. The plant container assembly of claim 1 wherein the base plate upwardly extending supports comprise a plurality of ribs extending upwardly from the base plate and engaging the container.

5. The plant container assembly of claim 4 wherein the base plate wall is of lower elevation than the support ribs to permit drainage to the exterior of treating fluid from the reservoir.

6. The plant container assembly of claim 1 wherein the base plate is of substantially greater diameter than the container and wherein the jacket is flared outwardly and downwardly to provide a stabilizing base for the assembly.

7. The jacketed nursery plant container assembly comprising in combination:

a container for the root structure and growing medium of the plant, having an open top and a perforate bottom portion;
 a peripherally walled base plate underlying the container and extending radially outwardly a substantial distance therefrom, providing a reservoir for the collection of plant treating fluids,
 wick means in the container, extending through the perforate bottom thereof into the reservoir,
 on the base plate a plurality of upwardly extending supports engaging the container and supporting the same a spaced distance from the base plate,
 an outwardly and downwardly flaring jacket surrounding the container above the base plate and having at its bottom an outwardly extending support foot or flange bearing against the base plate outside of but adjacent to the wall component thereof,
 snap fit retainer means on the outer margin of the base plate and engaging the foot,
 a plurality of drain holes in the foot for permitting the escape of overflow treating liquid to the exterior,
 the peripheral wall of the base plate being of lower elevation than the supports to permit overflow from the reservoir of excess treating fluids; and
 seal means on the upper margin of the tapered jacket positioned for contacting in sealing relation the exterior jacket surface adjacent the upper margin thereof.

* * * * *